United States Patent [19]
Meyer, Jr. et al.

[11] Patent Number: 6,016,214
[45] Date of Patent: Jan. 18, 2000

[54] QUADRUPLE GRATING PERIOD PPLN OPTICAL PARAMETRIC OSCILLATOR DIFFERENCE FREQUENCY GENERATOR WITH COMMON DOUBLY RESONANT CAVITY

[75] Inventors: Ronald K. Meyer, Jr., Chicago; Mohan Vaidyanathan, Algonguin; William Pekny, Schaumberg; Gerald P. Griffith, Western Springs, all of Ill.; Peter H. Mui, Fairfax, Va.

[73] Assignee: Northrop Grumman Corporation, Los Angeles, Calif.

[21] Appl. No.: 09/151,539

[22] Filed: Sep. 11, 1998

[51] Int. Cl.⁷ .............................. G02B 26/00; G02F 1/35
[52] U.S. Cl. .......................................... 359/237; 359/330
[58] Field of Search .................................... 359/237, 238, 359/239, 328, 330; 372/21

[56] References Cited

U.S. PATENT DOCUMENTS

| | | | |
|---|---|---|---|
| 4,731,787 | 3/1988 | Fan et al. | 372/22 |
| 4,809,291 | 2/1989 | Byer et al. | 372/75 |
| 4,907,238 | 3/1990 | Chun et al. | 372/32 |
| 5,068,546 | 11/1991 | Hemmerich et al. | 359/328 |
| 5,144,630 | 9/1992 | Lin | 372/22 |
| 5,179,562 | 1/1993 | Marason et al. | 372/22 |
| 5,206,868 | 4/1993 | Deacon | 372/21 |
| 5,243,612 | 9/1993 | Udagawa et al. | 372/22 |
| 5,276,548 | 1/1994 | Margalith | 359/339 |
| 5,297,156 | 3/1994 | Deacon | 372/21 |
| 5,483,374 | 1/1996 | Tanuma | 359/328 |
| 5,530,711 | 6/1996 | Scheps | 372/20 |
| 5,583,877 | 12/1996 | MacPherson et al. | 372/4 |
| 5,608,744 | 3/1997 | Hovis et al. | 372/21 |
| 5,619,517 | 4/1997 | Dixon | 372/21 |
| 5,640,405 | 6/1997 | Wallace et al. | 372/21 |
| 5,740,190 | 4/1998 | Moulton | 372/23 |
| 5,754,333 | 5/1998 | Fulbert et al. | 359/330 |
| 5,854,802 | 12/1998 | Jin et al. | 372/22 |

*Primary Examiner*—Georgia Epps
*Assistant Examiner*—Ricky Mack
*Attorney, Agent, or Firm*—Terry J. Anderson; Karl J. Hoch, Jr.

[57] ABSTRACT

The present invention relates generally to the field of optical devices and particularly to embodiments of a four-stage PPLN optical parametric oscillator/difference-frequency generator configuration. The present invention allows simultaneously and colinear generation of four wavelengths in efficient use of the pump signal. A first embodiment comprises a singly resonant cavity having an internal monolithic non-linear optical medium disposed in the cavity. The cavity is bounded by an input mirror and an output mirror. The monolithic non-linear optical medium is divided into four regions each having its own grating period. A second embodiment of the present invention comprises a monolithic non-linear optical medium divided into four separate regions. The entrance facet and exit facet of the monolithic non-linear optical medium includes a coating which acts as the cavity mirrors.

16 Claims, 3 Drawing Sheets

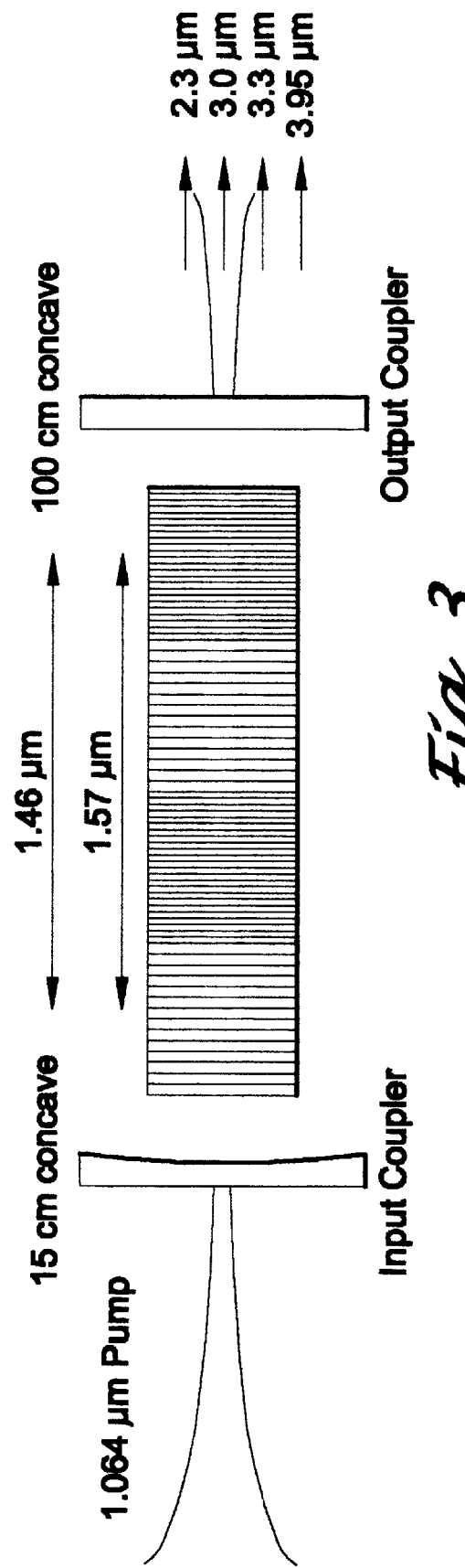

QUADRUPLE GRATING PERIOD PPLN OPTICAL PARAMETRIC OSCILLATOR DIFFERENCE FREQUENCY GENERATOR WITH COMMON DOUBLY RESONANT CAVITY

FIELD OF THE INVENTION

The present invention relates generally to the field of optical devices, and particularly to embodiments of a four-stage PPLN optical parametric oscillator difference frequency generator configuration. The present invention allows simultaneous and colinear generation of four wavelengths and efficient use of the pump signal.

BACKGROUND OF THE INVENTION

Production of adjustable coherent radiation through parametric amplification from a fixed frequency laser beam is effected through a device known as an optical parametric oscillator (OPO). The theoretical rational and complexities associated with parametric amplification and OPOs are well known to those skilled in the art.

In a conventional OPO, the OPO receives a beam of laser radiation at a pump frequency $\omega p$ from a pump source. The pump frequency $\omega p$ is received into a resonant optical cavity, wherein pump frequency $\omega p$ is directed through a nonlinear medium, usually a crystal, located within the resonant cavity. As a result, two lower energy signals are converted from the pump frequency $\omega p$ known as the signal frequency $\omega s$ and idler frequency $\omega i$.

The content and orientation of the crystal and the design of the resonant cavity determines the signal $\omega s$ and idler $\omega i$ frequencies. The feedback within the resonant cavity causes gain in the parametric waves, a process similar to build-up in a laser cavity. The cavity can either be singly resonant in which end mirrors reflect only signal frequency $\omega s$, or doubly resonant in which end mirrors reflect both signal $\omega s$ and idler $\omega i$ frequencies. End mirrors of the OPO are transparent to the pump frequency $\omega p$.

Due to the nature of the nonlinear crystal and the conversion process, the pump frequency $\omega p$ is always higher than the frequency of the signal frequency $\omega s$ and idler $\omega i$ frequencies. The sum of the signal $\omega p$ and idler $\omega i$ frequencies is equal to the pump frequency $\omega p$.

Power and energy conversion efficiency of the idler frequency $\omega i$ generation in an OPO is limited by the quantum efficiency and photon efficiency. Since idler frequency $\omega i$ is less than half of the pump frequency $\omega p$, the quantum limit is always less than half and significantly more so when the idler frequency $\omega i$ is far from degeneracy. Furthermore, for pulsed OPOs, pump regeneration from signal $\omega s$ and idler $\omega p$ frequency reduces photon conversion efficiency due by temporally and/or spatially varying pump radiation. Nevertheless, idler $\omega i$ output provides a useful means of generating coherent radiation in spectral regions that are difficult to access by other sources.

There are a variety of types of crystals that may be used in OPOs for various spectral regions. In particular, nonlinear optical crystals capable of producing parametric output which have been developed for commercial applications, include, but are not limited to, potassium tetanal phosphate (KTP), potassium tetanal arsenate (KTA), lithium niobate (LiNbO$_3$), potassium niobate (KNbO$_3$), silver gallium selenite (AgGaSe$_2$), and silver gallium sulfide (AgGaS$_2$). When a fixed laser is used to generate tunable waves from certain crystals, an electric field may be applied to the crystal, or the crystal may be temperature or angle tuned, or a combination of electrical voltage, temperature and/or angle tuning may be required (M. M. Fejer, G. A. Mabel, D. H. Jundt and R. L. Byer, "Quasi-Phase-Matched Second Harmonic Generation: Tuning And Tolerances," *IEEE J. Quantum Elecron;* Vol. 28, pp. 2631, 1992).

Periodically poled LiNbO$_3$ (PPLN) has been shown to be particularly well-suited for OPO wavelength generation in the 1.4–4.0 μm region due to its low threshold, large non-linear coefficient, large acceptance angles, absence of walk-off, and transparency in this region (L. E. Myers, R. C. Eckardt, M. M. Fejer, R. L. Byer, W. R. Bosenberg, and J. W. Pierce, J. Opt. Soc. Am. B, Vol. 12, pp. 2102–2116 (1995)). Although continuous wave OPOs utilizing PPLN have demonstrated high conversion efficiencies (W. R. Bosenberg, A. Drobshoff, J. I. Alexander, L. E. Myers, and R. L. Byer, Opt.Lett. 21, 1336–1338 (1996)), typically pulsed OPOs have not yet approached continuous wave OPO efficiencies due to factors such as back conversion of the pump wave and non-uniform pump depletion.

In typical configuration of an OPO using a crystal or PPLN medium, the crystal or PPLN is located between the two cavity mirrors. A light is directed through the entry mirror through the crystal or PPLN medium and through the exit mirror with certain frequencies being reflected back into the cavity to again be transmitted through the crystal or PPLN medium.

Other techniques of increasing conversion efficiency in similar OPO configurations suggest the inclusion of a second crystal or PPLN medium located within the cavity, and situated between the two cavity mirrors. In these structures, an entry mirror receives the light which directs the beam through a first crystal or PPLN to be received by a second crystal or PPLN and then on to an exit mirror. Again, the exit mirror transmits certain frequencies while reflecting other frequencies back through the crystal media.

Conversion schemes using tandem and intracavity difference frequency mixing (DFM) OPOs have been proposed and analyzed (K. Koch, G. T. Moore, and E. C. Cheung, *J. Opt, Soc. Am. B,* Vol. 12, pp. 2268–2273 (1995); and G. T. Moore and K. Koch, "The Tandem Optical Parametric Oscillator" *IEEE J. Quantum Electron.,* Vol. 32, pp. 2085–2094 (1996)) and such configurations may help mitigate some of the limitations inherent in pulsed OPOs, however, such suggested approaches fail to significantly increase conversion efficiency.

Increased signal conversion schemes utilizing multiple crystals within the cavity demonstrating the OPO-DFM concept applying two separate PPLN crystals are discussed and analyzed in J. M. Fukumoto, H. Komine, W. H. Long and E. A. Stapperts, "Periodically Poled LiNbO$_3$ Optical Parametric Oscillator With Intracavity Frequency Mixing," presented at Advanced Solid State Lasers (1998) (Optical Society of America, Washington, D.C.) (See also L. E. Myers, G. D. Miller, R. C. Eckardt, M. M. Fejer and R. L. Byer, "Quasi-Phase-Matched 1.064 μm-Pumped Optical Parametric Oscillator In Bulk Periodically Poled LiNbO$_3$", *Opt. Lett.* Vol. 20, pp. 52, 1995).

Reference may be had to the following patents for further information concerning the state of the technology relating to OPOs (all of the references are incorporated herein by reference):

U.S. Pat. No. 5,400,173, issued Mar. 21, 1995 entitled "Tunable Mid-Infrared Wavelength Converter Using Cascaded Parametric Oscillators" to Komine, describes an apparatus for converting a fixed wavelength signal into a plurality of spectral output beams. The first resonator is coupled to a first nonlinear optical crystal for turning said first and second output beams.

U.S. Pat. No. 5,500,865, issued Mar. 19, 1996 entitled "Phased Cascading Of Multiple Nonlinear Optical Elements For Frequency Conversion", to Chakmakjian, uses two or more crystals in tandem to increase the interaction length of the nonlinear optical process for improved efficiency. Additional optical components are inserted into the optical path to adjust the phase delay of the interacting waves in order to maintain coherent generation of the product radiation.

U.S. Pat. No. 4,639,923, issued Jan. 27, 1987, entitled, "Optical Parametric Oscillator Using Urea Crystal", to Tang, et al., uses a crystal of urea as the nonlinear optical medium for constructing an OPO.

U.S. Pat. No. 5,159,487, issued Oct. 27, 1992, entitled "Optical Parametric Oscillator OPO Having A Variable Line Narrowed Output", to Geiger et al., describes an OPO that includes a pump laser for producing a pump beam; an optical resonator; an OPO crystal disposed within the optical resonator aligned with and responsive to the pump beam to produce a parametrically generated output; and a device external to the optical resonator for line narrowing the parametrically generated output.

U.S. Pat. No. 5,144,630, issued Sep. 1, 1992, entitled "Multiwavelength Solid Stated Laser Using Frequency Conversion Technique", to Lin, describes an apparatus for producing multiwavelength coherent radiations ranging from deep ultraviolet to mid-infrared. The basic laser is a pulsed Nd:YAG or Nd:YLF laser which is frequency converted by a set of novel nonlinear crystals including DCDA, LBO, BBO, KTP and $KNBO_3$ where efficient schemes using noncritical phase matching and cylindrical focussing are employed.

U.S. Pat. No. 5,117,126, issued May 26, 1992, entitled "Stacked Optical Parametric Oscillator", to Geiger,, describes a stacked OPO wherein two optical parametric crystals are coaxially disposed in a single resonator, Incident radiation is coupled to the resonator and causes parametric oscillations of the two crystals. The two crystals are independently tuned, such as by angular orientation to produce distinct components of secondary radiation.

U.S. Pat. No. 5,079,445, issued Jan. 7, 1992, entitled "High Output Coupling Cavity Design For Optical Parametric Oscillators", to Guyer, discloses a cavity design for use with a nonlinear medium which may be used as an oscillator using pump energy with frequency (FP) interacting with the nonlinear medium for parametrically generating outputs having a signal frequency (FS) and an idler frequency (FI). The parametric radiation which is produced satisfy the relationship which is common for optical parametric amplifiers and oscillators FP=FS+FI.

U.S. Pat. No. 5,070,260, issued Dec. 3, 1991, entitled "Ultrahigh-Resolution Optical Parametric Oscillator Frequency Measurement and Synthesis System", to Wong, discloses one or more OPOs which are arranged selectively, singly, serially, and/or in parallel and each OPO is responsive to an input pump beam having a fractional stability to produce output signals and idler beams having fractional stabilities that correspond to or are better than the fractional stability of the pump beam and in such a way that the sum of the frequencies of the output signal and idler beams of each OPO is constrained to be equal to the frequency of the input beam thereof.

U.S. Pat. No. 5,047,668, issued Sep. 10, 1991, entitled "Optical Walkoff Compensation In Critically Phase-Matched Three-Wave Frequency Conversion Systems". to Bosenberg, discloses a walkoff-compensation frequency conversion system such as an OPO including a pair of nonlinear crystals such as: Beta-Barium Metaborate, aligned in an optical cavity with their optical axis at an angle with respect to the axis of the cavity.

U.S. Pat. No. 4,884,277, issued Nov. 28, 1989, to Anthon, et al., discloses an intracavity frequency-modified laser of improved amplitude stability which is obtained through the use of a plurality of nonlinear optical crystals within the laser cavity.

It is evident that it would be desirable to overcome the disadvantages of the stated art by providing an apparatus that allow simultaneous and colinear generation of four wavelengths in a efficient manner. Generation of additional difference idler and difference photon would be useful in several applications.

SUMMARY OF THE INVENTION

It is therefore the object of the present invention to provide an OPO-DFM-OPO-DFM structure for the purpose of increasing the conversion efficiency from the pump frequency $\omega p$ while also providing a structure to simultaneously and colinearly generate four wavelengths. The OPO-DFM-OPO-DFM structure is superior to OPO-DFM-OPM structures in desired applications as it generates an additional difference photon and idler photon.

The PPLN OPO-DFM-OPO-DFM structure of the present invention is useful for pointing systems that require excellent beam overlap as a result of the nature colinearity of non-critical phase-matching. Such applications may include, but are not limited to, atmospheric sensing, pollution control, windshear sensing, LIDAR and multi-spectral free-space communication.

The present invention relates to an intracavity dual optical parametric oscillator/difference-frequency mixing structure for the colinear generation of four separate wavelengths in efficient pump to idler wave conversion. The first embodiment of the present invention comprises an optical pump source for providing a pump beam at a primary wavelength. The pump beam is directed through an input mirror which couples the pump beam into a singly resonant cavity. An output mirror position opposite the input mirror is reflective of signal frequencies produced but is transmissive to the idler and difference-frequencies.

Disposed within the cavity, a monolithic non-linear optical medium includes four separate regions, each having a grating period. A first region with a specific grating operates as an optical parametric oscillator. A second region also having a grating period is adapted to operate as a difference-frequency mixer. The first region and the second region act together to operate as OPO-DFM structure to produce a first signal frequency, a first idler frequency and a first difference-frequency. The first idler frequency and first difference-frequency pass through the output mirror external to the cavity. The first signal frequency is resonated within the cavity. The pump energy that is yet to be depleted passes into the third region of the monolithic non-linear optical medium which acts as a optical parametric oscillator. The third medium has its own grating period, and a fourth region, also having its own grating period, is adapted to operate as a difference-frequency mixer. The third region and fourth region operate as a second OPO-DFM structure. The OPO-DFM structure produces a second signal frequency, a second idler frequency and a second difference-frequency. The second idler frequency and second difference-frequency pass through the output mirror while the second signal frequency is resonated within the system cavity.

In the preferred embodiment, the non-linear optical medium is a PPLN crystal divided into four separate regions. The first region has a grating period of 28.3 µm and said second region has a grating period of 32.22 µm. The third region has a grating period of 29.9 µm and the fourth region includes a grating period of 33.9 µm.

In the preferred embodiment, the intracavity dual optical parametric oscillator input mirror includes a high reflective coating of 98%R and a high transmissive coating of 90%T for the pump wavelength (1.064 µm). The input and output mirrors include coatings adapted for high reflectivity of the first and second signal wavelengths and high transmission of the first and second idler wavelengths and the first and second difference-frequencies.

Further, in the preferred embodiment, the first idler frequency is 3.95 µm, the first signal frequency is 1.46 µm and the first difference-frequency is 2.3 µm. Further, the second idler frequency is 3.3 µm, the second signal frequency is 1.57 µm and the second difference-frequency is 3.0 µm.

A second embodiment of the present invention includes a four-region non-linear PPLN crystal adapted to receive a pump signal from an optical pump source. The input facet of the monolithic non-linear optical medium and the exit facet of the non-linear optical medium each include a coating which is adapted to act as mirrors. The coatings replace the external mirrors as found in the first embodiment of the present invention. The mirrored coating is affixed as entry surface area of the monolithic optical medium and is adapted to couple the pump beam through the monolithic non-linear optical medium and adapted to reflect signal frequency. The mirrored coating affixed to the exit facet area of the non-linear optical medium is adapted to couple the idler in difference-frequency external to the optical medium and further adapted to reflect the signal frequencies. Preferably, the non-linear optical medium of the second embodiment of the present invention is a PPLN crystal and the first region has a grating period of 28.3 µm, the second region has a grating period of 32.2 µm. A third region has a grating period of 29.9 µm, and a fourth region includes a grating period 33.9 µm.

It should be noted and understood that with respect to the embodiments of the present invention, the materials suggested may be modified or substituted to achieve the general overall resultant high efficiency. The substitution of materials or dimensions remain within the spirit and scope of the present invention.

DETAILED DESCRIPTION OF THE PREFERRED EMBODIMENTS

The detailed description as set forth below in connection with the appended drawings is intended as a description of the presently preferred embodiments of the invention, and is not intended to represent the only form in which the present invention may be constructed or utilized. The description sets forth the functions and sequences of steps for constructing and operating the invention in connection with the illustrated embodiments. It is understood, however, that the same or equivalent functions and sequences may be accomplished by different embodiments and that they are also intended to be encompassed within the scope of this invention.

Figure 1:
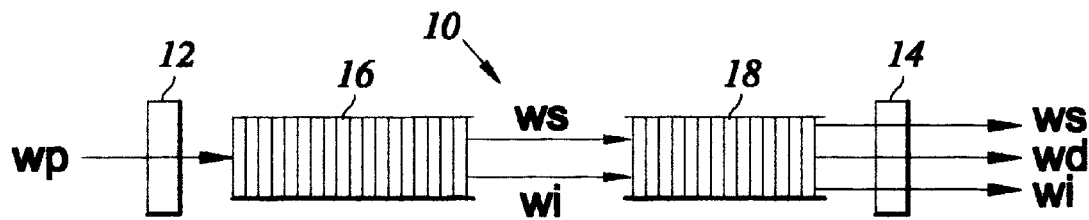
FIG. 1 is a schematic block diagram of a known OPO-DFM device.

Referring specifically to FIG. 1, there is shown a known intracavity difference-frequency mixing optical parametric oscillator 10 which produces signal frequency ωs, difference-frequency ωd and idler frequency ωi. The resonant cavity is defined by the input mirror 12 and the output mirror 14. Coaxially disposed within the cavity is a nonlinear crystal 16 which acts an Optical Parametric Oscillator (OPO) to produce signal frequency ωs and idler frequency ωi from the pump signal ωp. A second nonlinear crystal 18 is provided to effectuate difference-frequency mixing and to operate as a difference-frequency mixer (DFM) to produce a difference-frequency ωd and signal frequency ωs and idler frequency ωi. Thus, the structure shown in FIG. 2 is a OPO-DFM structure.

In operation, a pump source (not shown) provides a pump signal ωp into the resonant cavity through the input mirror 12. The beam is directed through the input mirror 12 onto the first nonlinear crystal 16 to produce signal wave ωs and idler wave ωi. Signal frequency ωs and idler frequency ωi is received by the second nonlinear crystal 18 which act as a DFM to produce a difference-frequency ωd along with signal frequency ωs and idler frequency ωi. Because the second nonlinear crystal 18 which acts as a DFM is located within the cavity, output efficiency of the idler frequency is increased. The output mirror 14 reflects a portion of the signal frequency as feedback through the cavity to provide a phase matching with the idler frequency ωi and to increase output conversion. The output mirror 14, however, is not 100% reflective to the signal frequency as overdriving the OPO-DFM with signal frequency ωs may deleteriously effect idler frequency ωi to produce less efficiency.

Variations on the prior art device shown in FIG. 1 include the coupling or forming of the OPO crystal and the DFM crystal on a single substrate. Likewise, an additional OPO may be included within the cavity to form an OPO-DFM-OPO configuration.

Figure 2:
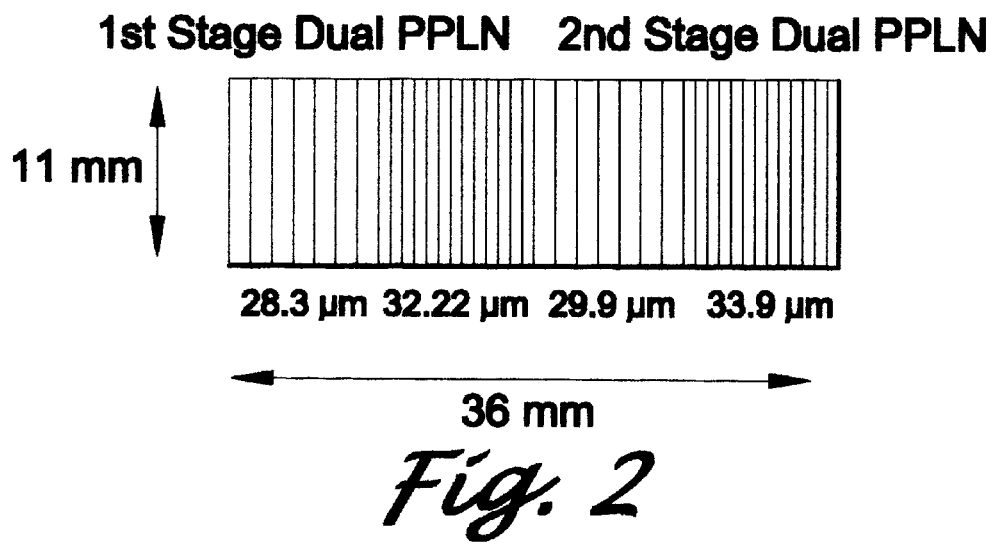
FIG. 2 is a schematic of the 4-stage PPLN crystal showing dimensions.
Figure 3:
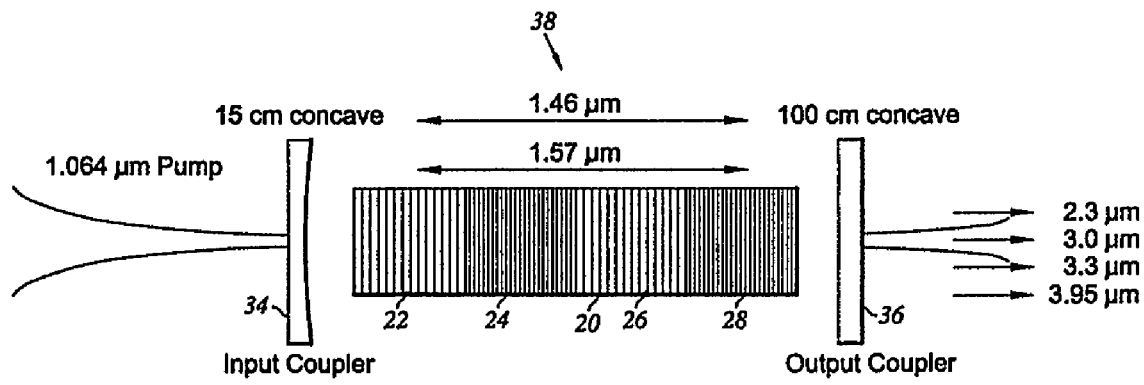
FIG. 3 is a schematic of the OPO-DFM-OPO-DFM structure within a resonator cavity of the present invention.
Figure 5:
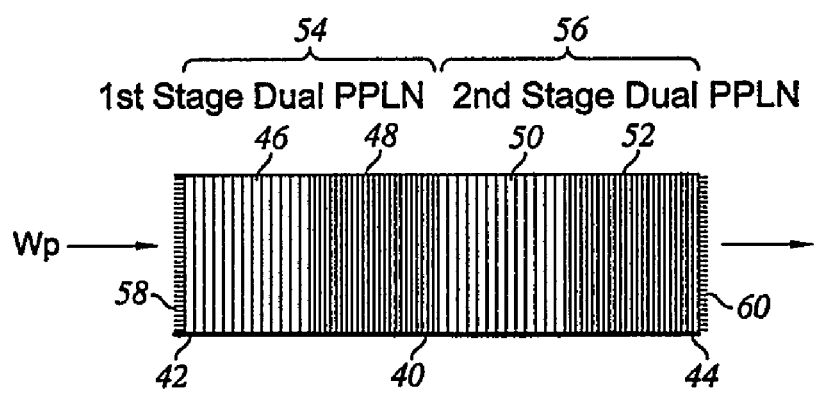

With an understanding of the modeling and experimental results of both the dual PPLN (OPO-DFM) and the OPO-DFM-OPO PPLN, the present invention proposes a 4-stage PPLN as shown in FIGS. 2 and 3. The quadruple grating period PPLN 20 includes four inline simultaneous functionalities, an OPO 22, DFM 24, OPO 26, and DFM 28. The PPLN 20 design and grating periods are illustrated in FIG. 2, and consists of two dual PPLNs (OPO-DFM) 30 and 32 incorporated in a single element. The first stage dual PPLN 30 has an OPO 22 grating period of 28.3 µm and a DFM 24 grating period of 32.22 µm which produces a 3.95 µm idler, 1.46 µm signal, and 2.3 µm difference. The undepleted pump (1.064 µm) exiting the first pair of grating periods then pumps the second dual PPLN 32, having an OPO 26 grating period of 29.9 µm and a DFM 28 grating period of 33.9 µm, producing a 3.3 µm idler, a 1.57 µm signal, and a 3.0 µm difference.

The architecture of the entire structure as shown in FIG. 3 was modeled using typical mirror coating values and transmission losses through the resonator optics. An input coupler 34 includes a high reflection coating (98%R) for both signal wavelengths and a high transmission coating (90%T) for the pump wavelength (1.064 μm). The output coupler 36 coating is adapted for high reflection at both signal wavelengths and high transmission at 3.9 μm. The OPO-DFM-OPO-DFM cavity 38 resonates for each of the two signals originating from the two OPOs 22 and 26.

Figure 4:
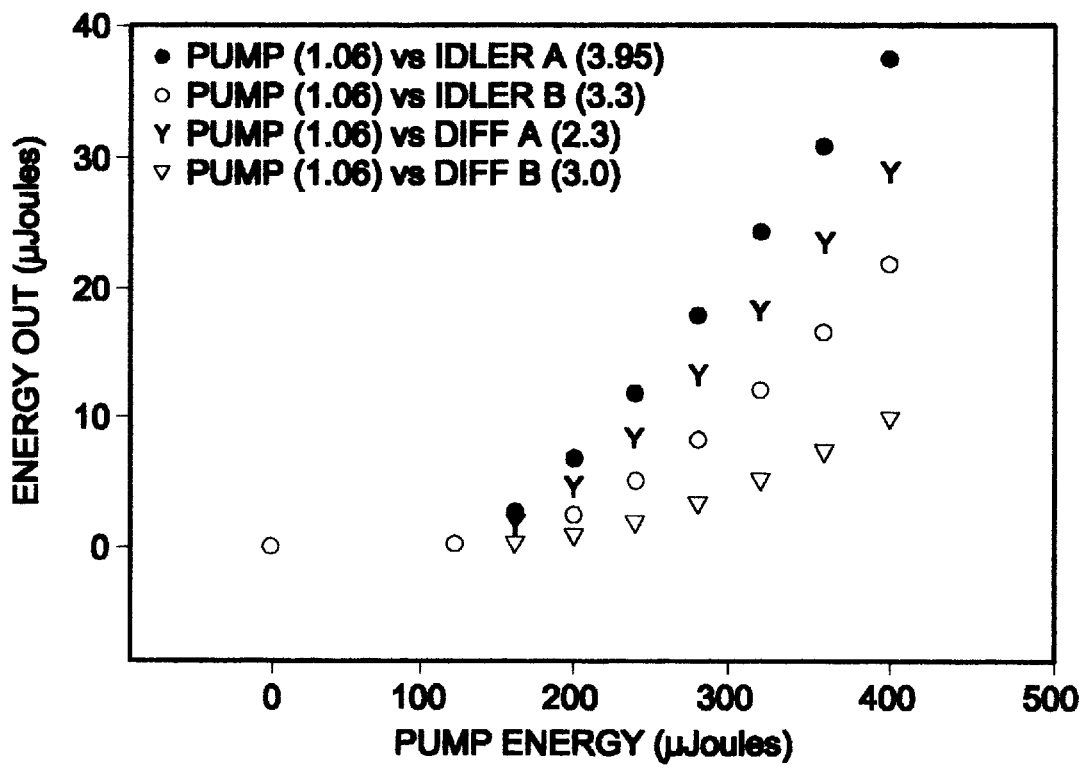
FIG. 4 is a graphical chart showing the input power versus the output power predicted in operation of the first embodiment of the present invention.

The predicted results for the architecture as shown in FIG. 3 are illustrated in the chart shown in FIG. 4. Based on a maximum pump energy of 400 μJoule, output energies of 37 μJoule at 3.95 μm, 22 μJoule at 3.3 μm, 29 μJoule at 2.3 μm and 100 μJoule at 3.0 μm are predicted.

The PPLN OPO-DFM-OPO-DFM 38 enables simultaneous and colinear generation of four wavelengths and a more efficient utilization of the 1.064 μm pump power. The single PPLN 20 element of the present invention is particularly useful for pointing systems that require excellent beam overlap as a result of the natural colinearity afforded by noncritical phase matching. The OPO-DFM-OPO-DFM 38 architecture of the present invention is superior to previously known OPO-DFM-OPO structures in certain applications in that it generates an additional difference photon and additional idler photon are generated.

Figure 5:
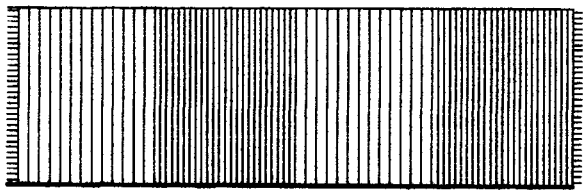
FIG. 5 is a schematic of the OPO-DFM-OPO-DFM structure of the present invention wherein the cavity mirrors are intrinsic with the surface of the PPLN.
Figure 2:
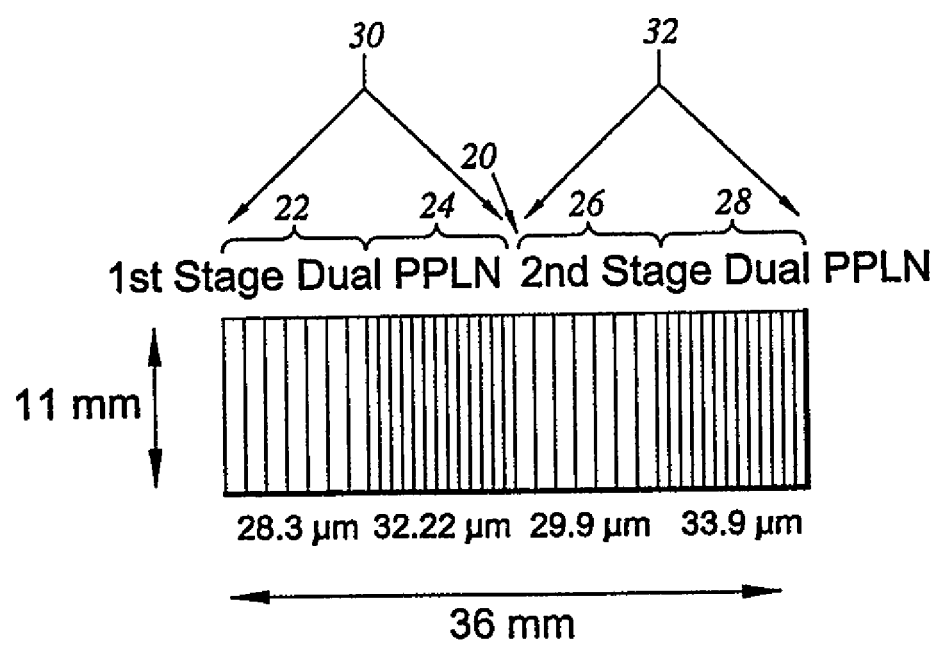

Referring specifically to FIG. 5, there is shown a second embodiment of the present invention. The 4-stage PPLN 40 of the second embodiment of the present invention is shown. The input facet 42 and the output facet 44 of the PPLN 40 have been coated intrinsically to act as input and output couplers, thereby eliminating the need for external mirrors. Thus, the PPLN 40 acts as its own linear resonator.

The PPLN 40 element comprises elements each having different grating periods OPO 46, DFM 48, OPO 50 and DFM 52. The first stage dual PPLN 54 and the second stage dual PPLN 56 are in tandem and act as dual OPO-DFM structures, respectively. FIG. 5 illustrates intrinsic mirrored dual OPO-DFM PPLN architecture. The input facet 42 of the monolithic element includes a thin film coating 58 which is applied to the surface area of the input facet 42. The coating is formed by Quality Thin Films for high reflection of the signal wavelength (1.46 μm), high transmission of the pump source and high reflection of the idler frequency. The output facet 44 additionally includes a coating 60 also made from Quality Thin Films which includes a 90% reflection for the signal (1.46 μm) high transmission for the idler (3.95 μm), and high reflection for the pump (1.064 μm).

The second embodiment of the present invention is an enhancement to other structures which have external mirrors. The intrinsic mirror coatings 58 and 60 reduce weight and save space by eliminating additional elements such as mirrors and mirror mounts. External mirrors and mirror mounts increase the system's susceptibility to the effects of vibration encountered in flight and other applications. Furthermore, the intrinsic mirrors make the entire OPO simple to replace, mount and align.

Examples of OPO and DFM crystals of differing material that may be used with respect to the embodiments of the present invention include potassium tetanal phosphate ($KTiOPO_4$) and potassium or rubidium tetanal arsenate ($KTiOAsO_4$ or $RbTiOAsO_4$). These crystals use birefringent phase matching that involves a proper choice of propagation direction and polarization components. The birefringent phase matched DFM materials for the infrared region include silver gallium selenite ($AgGaSe_2$), silver gallium sulfide ($AgGaS_2$), gallium selenite (GaSe), and zinc germanium phosphide ($ZnGeP_2$). Gallium arsenide (GaAs) and zinc selenite (ZnSe) are candidates for DFM crystals based on quasi-phase matching, while periodically-poled lithium niobate (PPLN) crystals can be used for a quasi-phase matched OPO.

For birefringent DFM crystals that require orthongonally polarized signal and idler components, the OPO crystal orientation and beam propagation are selected to satisfy that condition. For quasi-phase matched DFM crystals with parallel polarization components, the OPO crystal must provide signal and idler components with parallel polarizations. The optimum combination of materials depend on the wavelengths of the pump, signal, and idler radiation.

Additional modifications and improvements of the present invention may also be apparent to those skilled in the art. Thus, the particular combination of the parts described and illustrated herein is intended to represent only one embodiment of the present invention, and is not intended to serve as limitations of alternative devices within the spirit and scope of the invention.

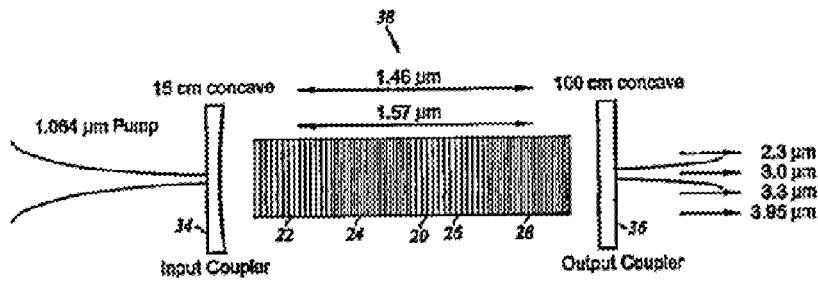

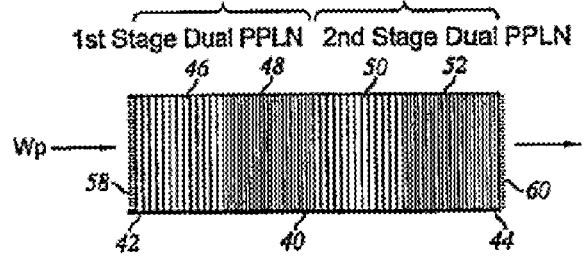

What is claimed is:

1. An intracavity dual optical parametric oscillator/difference-frequency mixing structure for colinear generation of four separate wavelengths and efficient pump to idler wave conversion comprising:

(a) an optical pump source for providing a pump beam at a primary wavelength;

(b) a singly resonant cavity having an input end and an output end;

(c) a monolithic nonlinear optical medium disposed in said cavity for sustaining optical parametric oscillation and difference-frequency mixing, said monolithic nonlinear optical medium comprising:

(i) a first region having a first grating period adapted to operate as an optical parametric oscillator;

(ii) a second region having a second grating period adapted to operate as a different frequency mixer wherein said first and second regions are adapted to produce a first signal frequency, a first idler frequency and a first-difference frequency;

(iii) a third region having a third grating period adapted to operate as an optical parametric oscillator; and (iv) a fourth region having a fourth grating period adapted to operate as a difference-frequency mixer wherein said third and fourth regions are adapted to produce a second signal frequency, a second idler frequency and a second difference-frequency.

(d) an input mirror positioned at the input end of said cavity, adapted to couple the pump beam into the resonator cavity through the monolithic nonlinear optical medium and further adapted to be reflective of the first and second signal frequencies to resonate the signal frequencies within the cavity; and (e) an output mirror positioned at the output end of said cavity, adapted to couple the first and second difference-frequencies and first and second idler frequencies external to the cavity, and further adapted to be reflective of the first and second signal frequency to resonate the signal frequencies within the cavity.

2. The intracavity dual optical parametric oscillator/difference-frequency mixing structure of claim 1 wherein said nonlinear optical medium is a PPLN crystal.

3. The intracavity dual optical parametric oscillator/difference-frequency mixing structure of claim 1 wherein said first region has a grating period of 28.3 μm and said second region as a grating period of 32.22 μm.

4. The intracavity dual optical parametric oscillator/difference-frequency mixing structure of claim 1 wherein said third region has a grating period of 29.9 µm, and a wherein said fourth region includes a grating period of 33.9 µm.

5. The intracavity dual optical parametric oscillator/difference-frequency mixing structure of claim 1 wherein said input mirror includes a high reflective coating of 98%R and a high transmission coating of 90%T for the pump wavelength (1.064 µm).

6. The intracavity dual optical parametric oscillator/difference-frequency mixing structure of claim 1 wherein of said input and output mirrors include coatings adapted for high reflectivity of the first and second signal wavelengths and high transmission at the first and second idler wavelengths and first and second difference-frequencies.

7. The intracavity dual optical parametric oscillator/difference-frequency mixing structure of claim 1 wherein said first idler frequency is 3.95 µm.

8. The intracavity dual optical parametric oscillator/difference-frequency mixing structure of claim 1 wherein said first signal frequency is 1.46 µm.

9. The intracavity dual optical parametric oscillator/difference-frequency mixing structure of claim 1 wherein said first difference-frequency is 2.3 µm.

10. The intracavity dual optical parametric oscillator/difference-frequency mixing structure of claim 1 wherein said second idler frequency is 3.3 µm.

11. The intracavity dual optical parametric oscillator/difference-frequency mixing structure of claim 1 wherein said second signal frequency is 1.57 µm.

12. The intracavity dual optical parametric oscillator/difference-frequency mixing structure of claim 1 wherein said second difference-frequency is 3.0 µm.

13. An intracavity optical parametric oscillator/difference-frequency mixing structure having mirrors intrinsically formed with the nonlinear medium comprising:
   (a) an optical pump source for providing a pump beam at a primary wavelength;
   (b) a monolithic nonlinear optical medium having four periodic regions wherein a first region defines the entry surface area and a fourth region defines the exit surface area and second and third regions are positioned between said first and fourth regions;
   (c) a mirrored coating affixed to the entry surface area of the monolithic optical medium adapted to couple the pump beam through the monolithic nonlinear optical medium and adapted to reflect signal frequencies; and
   (d) a mirrored coating affixed to the exit surface area of said nonlinear optical medium adapted to couple the idler and difference-frequencies external to the optical medium and further adapted to reflect signal frequencies.

14. The intracavity dual optical parametric oscillator/difference-frequency mixing structure of claim 13 wherein said nonlinear optical medium is a PPLN crystal.

15. The intracavity dual optical parametric oscillator/difference-frequency mixing structure of claim 13 wherein said first region has a grating period of 28.3 µm and said second region as a grating period of 32.22 µm.

16. The intracavity dual optical parametric oscillator/difference-frequency mixing structure of claim 13 wherein said third region has a grating period of 29.9 µm, and a wherein said fourth region includes a grating period of 33.9 µm.

* * * * *

UNITED STATES PATENT AND TRADEMARK OFFICE
CERTIFICATE OF CORRECTION

| | | |
|---|---|---|
| PATENT NO. | : 6,016,214 | |
| APPLICATION NO. | : 09/151539 | |
| DATED | : January 18, 2000 | |
| INVENTOR(S) | : Ronald K. Meyer, Jr. et al. | |

It is certified that error appears in the above-identified patent and that said Letters Patent is hereby corrected as shown below:

The title page showing the illustrative figure should be deleted to be replaced with the attached title page.

The drawings 2, 3 and 5, consisting of Figs. 2, 3 and 5, should be deleted to be replaced with drawing sheets consisting of Figs. 2, 3 and 5, as shown on the attached page.

Signed and Sealed this

Fourteenth Day of August, 2007

JON W. DUDAS
*Director of the United States Patent and Trademark Office*

United States Patent [19]
Meyer, Jr. et al.

[11] Patent Number: 6,016,214
[45] Date of Patent: Jan. 18, 2000

[54] QUADRUPLE GRATING PERIOD PPLN OPTICAL PARAMETRIC OSCILLATOR DIFFERENCE FREQUENCY GENERATOR WITH COMMON DOUBLY RESONANT CAVITY

[75] Inventors: Ronald K. Meyer, Jr., Chicago; Mohan Vaidyanathan, Algonquin; William Pekny, Schaumberg; Gerald P. Griffith, Western Springs, all of Ill.; Peter H. Mui, Fairfax, Va.

[73] Assignee: Northrop Grumman Corporation, Los Angeles, Calif.

[21] Appl. No.: 09/151,539

[22] Filed: Sep. 11, 1998

[51] Int. Cl.$^7$ .................. G02B 26/00; G02F 1/35
[52] U.S. Cl. ............................ 359/237; 359/330
[58] Field of Search .................. 359/237, 238, 359/239, 328, 330; 372/21

[56] References Cited

U.S. PATENT DOCUMENTS

| | | | |
|---|---|---|---|
| 4,731,787 | 3/1988 | Fan et al. | 372/22 |
| 4,809,291 | 2/1989 | Byer et al. | 372/75 |
| 4,907,238 | 3/1990 | Chun et al. | 372/32 |
| 5,068,546 | 11/1991 | Hemmerich et al. | 359/328 |
| 5,144,630 | 9/1992 | Lin | 372/22 |
| 5,179,562 | 1/1993 | Marason et al. | 372/22 |
| 5,206,868 | 4/1993 | Deacon | 372/21 |
| 5,243,612 | 9/1993 | Udagawa et al. | 372/22 |
| 5,276,548 | 1/1994 | Margalith | 359/339 |
| 5,297,156 | 3/1994 | Deacon | 372/21 |
| 5,483,374 | 1/1996 | Tatsuno | 359/328 |
| 5,530,711 | 6/1996 | Scheps | 372/20 |
| 5,583,877 | 12/1996 | MacPherson et al. | 372/4 |
| 5,608,744 | 3/1997 | Hovis et al. | 372/21 |
| 5,619,517 | 4/1997 | Dixon | 372/21 |
| 5,640,408 | 6/1997 | Wallace et al. | 372/21 |
| 5,740,190 | 4/1998 | Moulton | 372/23 |
| 5,754,333 | 5/1998 | Fulbert et al. | 359/330 |
| 5,854,802 | 12/1998 | Jin et al. | 372/22 |

*Primary Examiner*—Georgia Epps
*Assistant Examiner*—Ricky Mack
*Attorney, Agent, or Firm*—Terry J. Anderson; Karl J. Hoch, Jr.

[57] ABSTRACT

The present invention relates generally to the field of optical devices and particularly to embodiments of a four-stage PPLN optical parametric oscillator/difference-frequency generator configuration. The present invention allows simultaneously and collinear generation of four wavelengths in efficient use of the pump signal. A first embodiment comprises a singly resonant cavity having an internal monolithic non-linear optical medium disposed in the cavity. The cavity is bounded by an input mirror and an output mirror. The monolithic non-linear optical medium is divided into four regions each having its own grating period. A second embodiment of the present invention comprises a monolithic non-linear optical medium divided into four separate regions. The entrance facet and exit facet of the monolithic non-linear optical medium includes a coating which acts as the cavity mirrors.

16 Claims, 3 Drawing Sheets